(12) United States Patent
Kim et al.

(10) Patent No.: US 7,663,610 B2
(45) Date of Patent: Feb. 16, 2010

(54) METHOD OF DISPLAYING OBJECT AND TERMINAL CAPABLE OF IMPLEMENTING THE SAME

(75) Inventors: Tae Hun Kim, Incheon-si (KR); Boem Young Woo, Gyeonggi-do (KR); Jeong Hyuk Yoon, Seoul (KR); Hyun Ju Ahn, Seoul (KR); Seung Sook Han, Gyeonggi-do (KR); Jun Serk Park, Seoul (KR); Ho Sang Cheon, Seoul (KR)

(73) Assignee: LG Electronics Inc., Seoul (KR)

( * ) Notice: Subject to any disclaimer, the term of this patent is extended or adjusted under 35 U.S.C. 154(b) by 30 days.

(21) Appl. No.: 11/729,807

(22) Filed: Mar. 30, 2007

(65) Prior Publication Data

US 2007/0232362 A1    Oct. 4, 2007

(30) Foreign Application Priority Data

Mar. 30, 2006    (KR) ..................... 10-2006-0028933

(51) Int. Cl.
    *G09G 5/00*    (2006.01)
(52) U.S. Cl. .................. 345/173; 345/156; 715/835
(58) Field of Classification Search ......... 345/156–184; 178/18.01, 18.03; 715/835, 846; 455/566
    See application file for complete search history.

(56) References Cited

U.S. PATENT DOCUMENTS

| 5,008,853 | A | * | 4/1991 | Bly et al. | |
| 5,844,547 | A | | 12/1998 | Minakuchi et al. | |
| 2003/0016211 | A1 | * | 1/2003 | Woolley | 345/173 |
| 2006/0274046 | A1 | * | 12/2006 | Hillis et al. | 345/173 |
| 2007/0157089 | A1 | * | 7/2007 | Van Os et al. | 715/846 |

FOREIGN PATENT DOCUMENTS

| JP | 05119946 A | | 5/1993 |
| JP | 2005196810 | * | 7/2005 |

* cited by examiner

*Primary Examiner*—Regina Liang
(74) *Attorney, Agent, or Firm*—Birch, Stewart, Kolasch & Birch, LLP (57) ABSTRACT

A method of displaying an object and terminal capable of implementing the same are disclosed, by which various objects attributed to various functions provided within the terminal can be displayed to maximize facilitation and convenience of a user of the terminal. The present invention includes an object displaying step of displaying the object movable on the touchscreen on a first position on the touchscreen and an object position fixing step of if a first touch action is carried out on the object, fixing a position of the object to the first position.

8 Claims, 7 Drawing Sheets

METHOD OF DISPLAYING OBJECT AND TERMINAL CAPABLE OF IMPLEMENTING THE SAME

This application claims the benefit of the Korean Patent Application No. 10-2006-0028933, filed on Mar. 30, 2006, which is hereby incorporated by reference as if fully set forth herein.

BACKGROUND OF THE INVENTION

1. Field of the Invention

The present invention relates to a terminal, and more particularly, to a method of displaying an object and terminal capable of implementing the same. Although the present invention is suitable for a wide scope of applications, it is particularly suitable for displaying such an object as a video file, an audio file, a message and the like in a mobile terminal.

2. Discussion of the Related Art

Generally, the remarkable developments of the information communication technologies bring rapid transitions of information and communication environments. A mobile communication terminal is regarded as a necessity in a modern society to be globally used.

In order to meet the user's demand according to the base expansion of the mobile communication terminals, various functions including a short message service function, an MMS (multimedia messaging system) function, an Internet access function as well as a general voice calling are provided to the mobile communication terminal.

Besides, as the tendency for convergence to provide various functions to one device expands, various additional functions including a multimedia play function, a photographing function, a game function and the like as well as a basic communicational function are provided to a mobile communication terminal such as a mobile phone.

To execute theses functions, an object such as a phone number, a communication list, a text/voice/multimedia message, a video file, and audio file and the like is frequently represented as an icon to be displayed in a terminal.

However, since the types and numbers of the objects tend to increase in proportion to the diversity of the functions, the demand for a method of displaying the objects more efficiently rises to meet the convenience of a terminal user.

SUMMARY OF THE INVENTION

Accordingly, the present invention is directed to a method of displaying an object and terminal capable of implementing the same that substantially obviate one or more problems due to limitations and disadvantages of the related art.

An object of the present invention is to provide a method of displaying an object and terminal capable of implementing the same, by which various objects attributed to various functions provided within the terminal can be displayed to maximize facilitation and convenience of a user of the terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of displaying an object in a terminal having a touchscreen according to the present invention includes an object displaying step of displaying the object movable on the touchscreen on a first position on the touch screen and an object position fixing step of if a first touch action is carried out on the object, fixing a position of the object to the first position.

In another aspect of the present invention, a terminal includes a touch screen and a control unit controlling a movable object to be displayed at a first position on the touchscreen, the control unit controlling the displayed object to be fixed to the first position if a first touch action is carried out on the displayed object.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention is applicable to a kiosk terminal such as ATM (automatic teller machine) and the like as well as a mobile terminal such as a mobile phone, a PDA (personal digital assistant), a PMP (portable multimedia player), a game player, and the like. Yet, for convenience and simplicity of explanation in the following description, it is assumed that the present invention is applied to a mobile terminal such as a mobile phone. So, it should be understood that the present invention is not limited to the following explanation and embodiments.

First of all, a configuration of a mobile terminal according to the present invention is explained with reference to FIG. 1 as follows.

Figure 1:
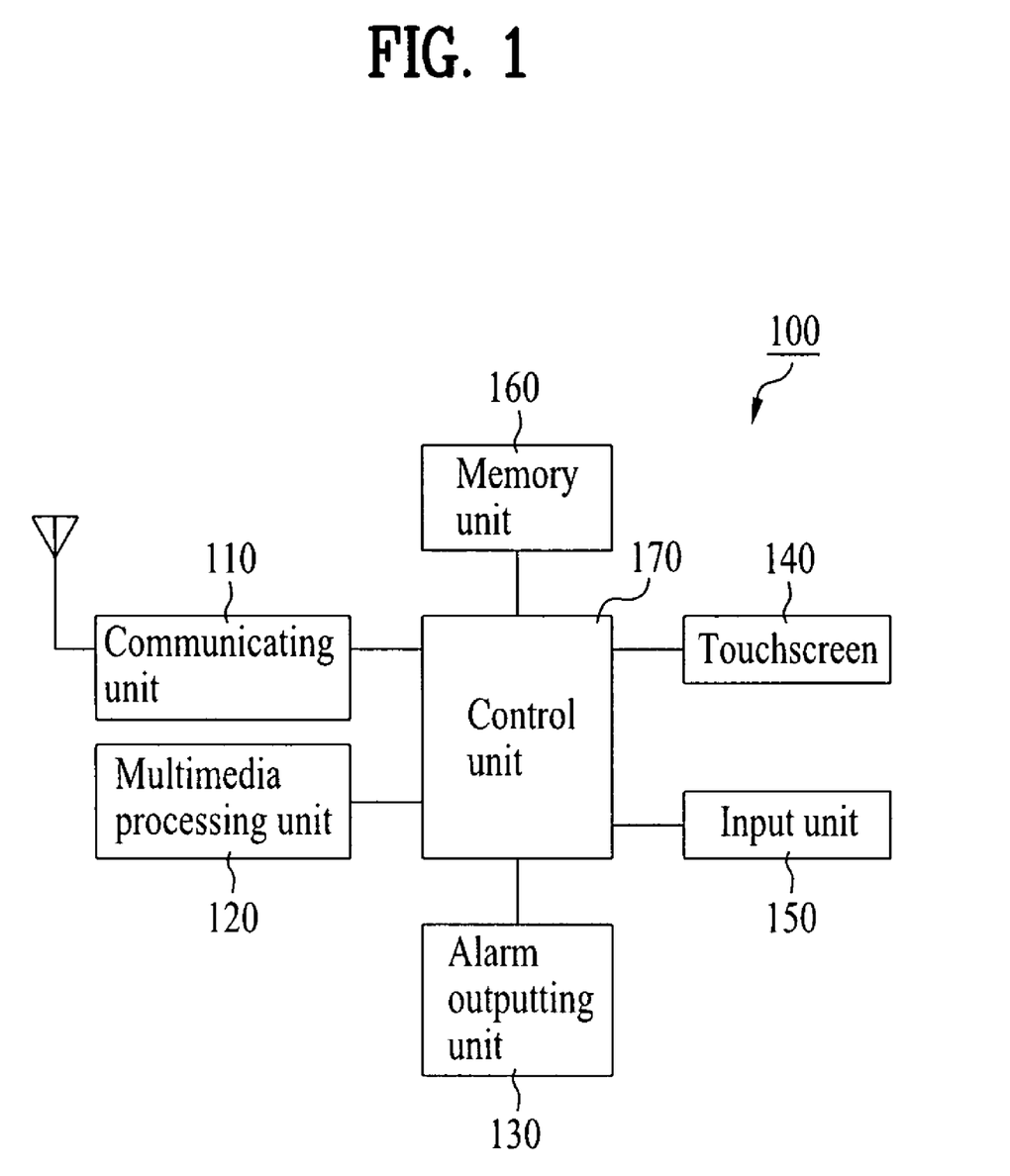
FIG. 1 is a schematic bock diagram of a mobile terminal according to the present invention.

FIG. 1 is a schematic block diagram of a mobile terminal according to the present invention.

Referring to FIG. 1, a mobile terminal 100 according to the present invention preferably includes a communicating unit 110, a multimedia processing unit 120, a touchscreen 140, a memory unit 160, an input unit 150, an alarm outputting unit 130, and a control unit 170.

Of course, the mobile terminal according to the present invention can be provided with other various additional elements as well as the aforesaid elements. Yet, since the additional elements are not directly associated with the present invention, explanations for the additional elements will be omitted in the following description for concise explanation of the present invention. And, the respective elements are explained as follows.

First of all, the communicating unit 110 is responsible for a mobile communication network access and RF signal transmission/reception. And, the communicating unit 110 enables the mobile terminal 100 to perform voice communication, SMS (short message service) communication, MMS (multimedia messaging service) communication with a third party via a mobile communication network. If a communication function is unnecessary for the mobile terminal 100 that is not a mobile phone, the communicating unit 110 can be removed from the mobile terminal 100.

The multimedia processing unit 120 enables the mobile terminal 100 to play multimedia contents such as audio files, image files, moving picture files, and the like. If the multimedia contents play function is unnecessary for the mobile terminal 100, the multimedia processing unit 120 can be removed from the mobile terminal 100.

The memory unit 160 stores a plurality of software for driving various functions provided by the mobile terminal 1 and various kinds of data associated with the software. And, the memory unit 160 is capable of storing multimedia contents such as audio files, image files, moving picture files, and the like to be reproduced by the multimedia processing unit 120.

The touchscreen 140 plays a role as a display unit displaying a real-time operational situation of the mobile terminal 100 and pictures according to the various functions provided by the mobile terminal 100. And, the touchscreen 140 plays a role as an input unit to receive various touch commands or information inputted by a terminal user. Moreover, the touchscreen 140 can be configured with one of contact electrostatic capacitive type, pressure resistive overlay type, infrared beam detective type, surface acoustic wave type, integral strain gauge type, piezoelectric type, and the like.

Besides the touchscreen 140, the input unit 150 enables the terminal user to input various commands or information. If the touchscreen 140 is enough to receive user commands and information, it is able to remove the input unit 150 from the mobile terminal 100.

The alarm outputting unit 130 preferably includes at least one of a speaker (not shown in the drawing) and a vibration motor (not shown in the drawing). The alarm outputting unit 130 outputs sound and/or vibration to provide alarm to a user if necessary.

The control unit 170 controls the communicating unit 110, the multimedia processing unit 120, the touchscreen 140, the memory unit 160, the input unit 150, and the alarm outputting unit 130 to enable an object displaying method according to the present invention, which will be explained in the following description, to be implemented in the mobile terminal 100.

A method of displaying an object in the above configured mobile terminal 100 according to the one embodiment of the present invention is explained with reference to FIGS. 2 to 9 as follows.

Figure 2:
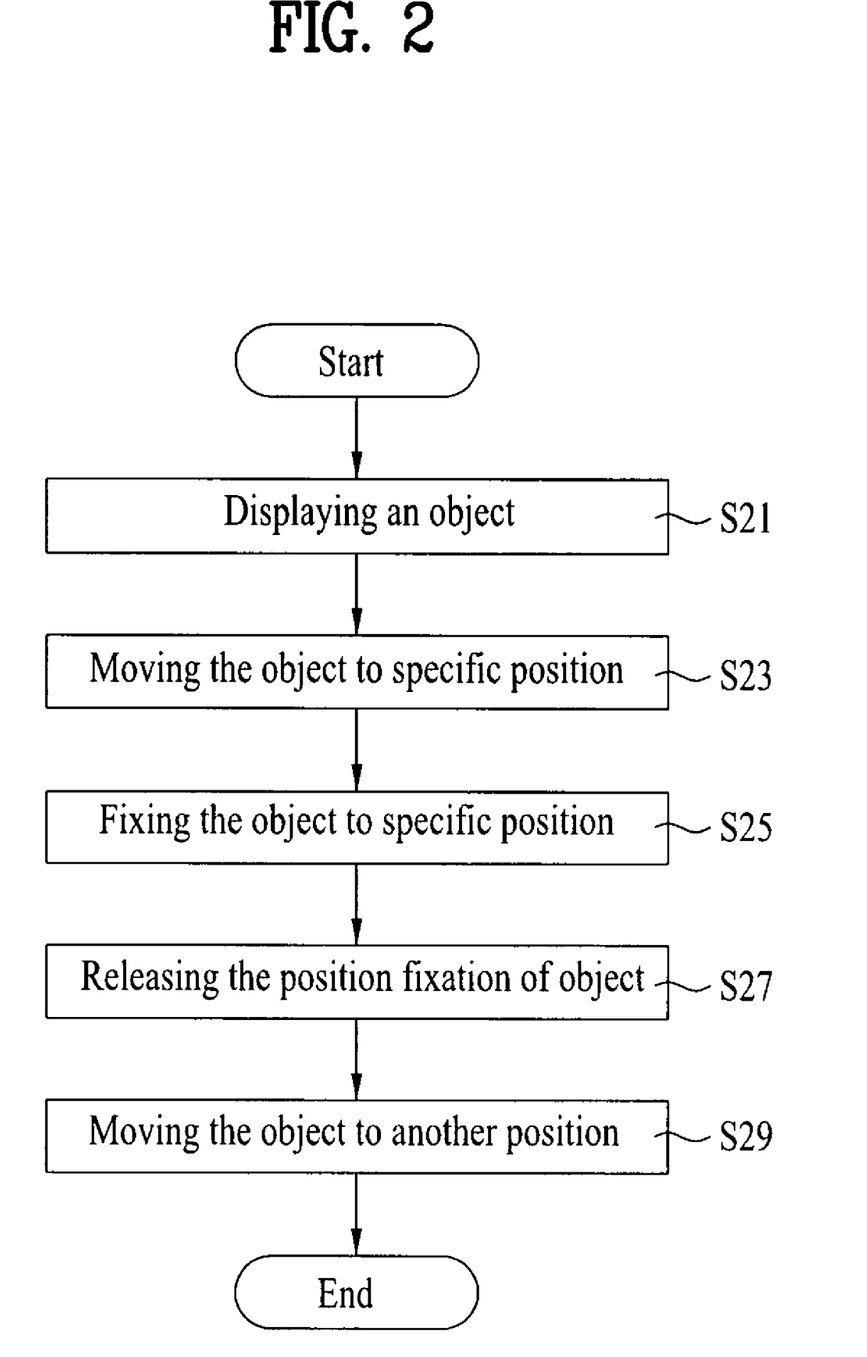
FIG. 2 is a flowchart of a method of displaying an object according to one embodiment of the present invention.

FIG. 2 is a flowchart of a method of displaying an object according to one embodiment of the present invention, and FIGS. 3 to 9 are diagrams of pictures on a terminal touch screen for executing a method of displaying an object according to one embodiment of the present invention. For convenience of explanation for FIGS. 3 to 9, it is assumed that one object is displayed on the touchscreen only.

Figure 3:
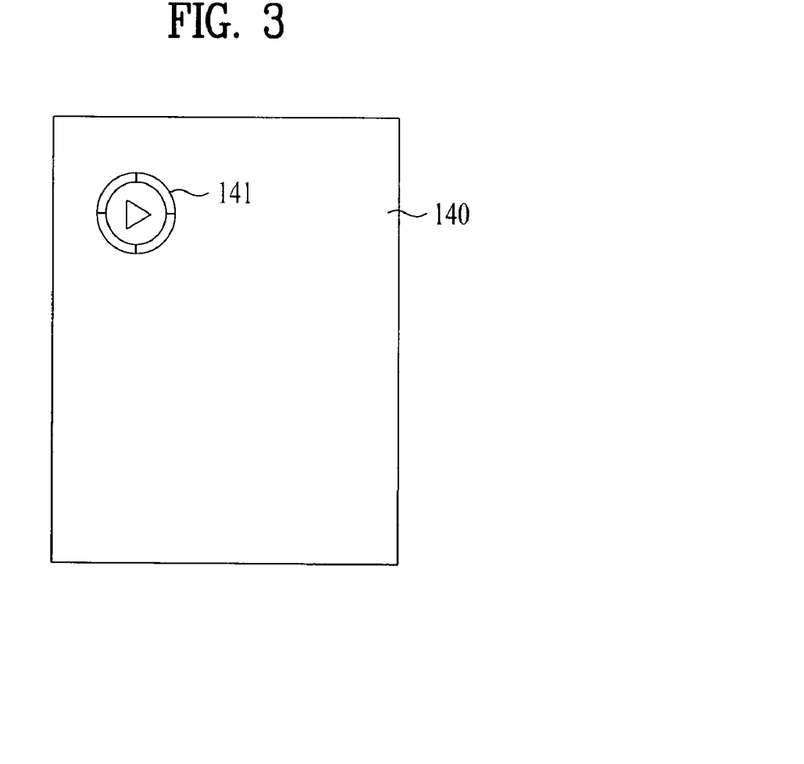
FIGS. 3 to 9 are diagrams of pictures on a terminal touchscreen for executing a method of displaying an object according to one embodiment of the present invention.

First of all, one object 141, as shown in FIG. 3, is displayed on the touchscreen 140 (S21). The object 141 is movable to a random position on the touchscreen 140 to be arranged thereon. The object 141 is able to move in various ways. Preferably, the object 141 is touched and then dragged and dropped to a random position.

Figure 4:
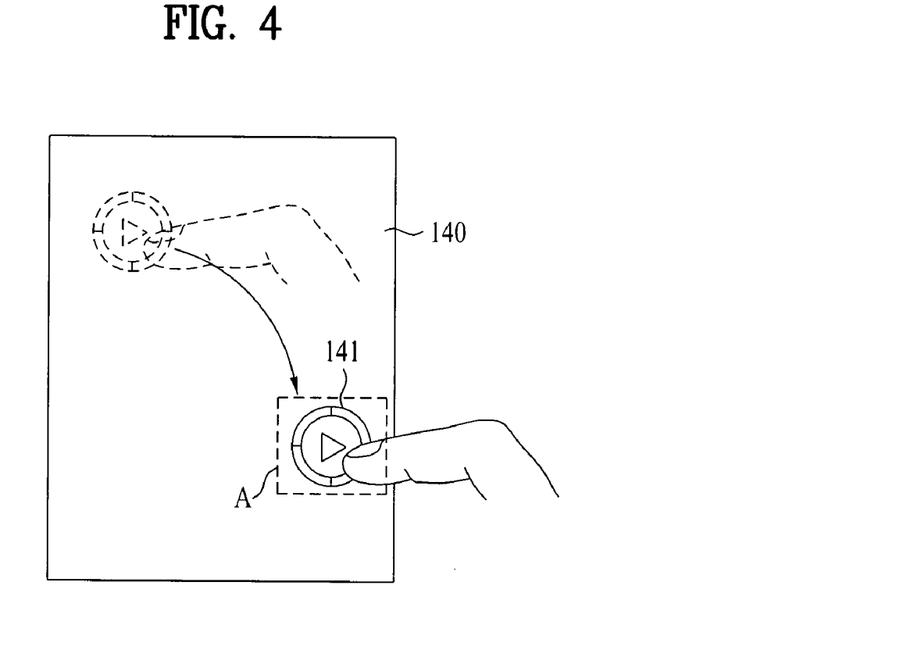

The displayed object 141, as shown in FIG. 4, is moved to a position-A specified by a terminal user (S23). The specified position-A means a position to which the terminal user attempts to fix the object 141. The position fixation will be explained later. If a position specified by a terminal user corresponds to an original position whether the object is displayed, the step S23 can be skipped.

Subsequently, a touch action of the terminal user, as shown in FIGS. 5A to 5D, is carried out on the moved object 141 for the position fixation of the object (S25). Various examples of the touch action are explained with reference to FIGS. 5A to 5D as follows. And, it is apparent to those skilled in the art that the examples of the touch action are not limited to those shown in FIGS. 5A to 5D.

Figure 5A:
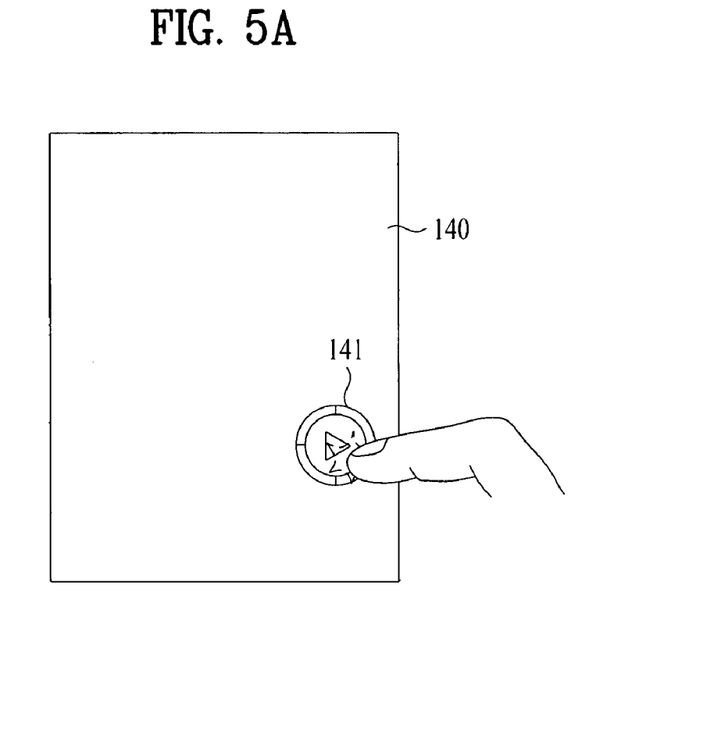

FIG. 5A shows that the object can be fixed to the specified position if the terminal user keeps touching the object during a prescribed time (e.g., 3 seconds) at least.

Figure 5B:
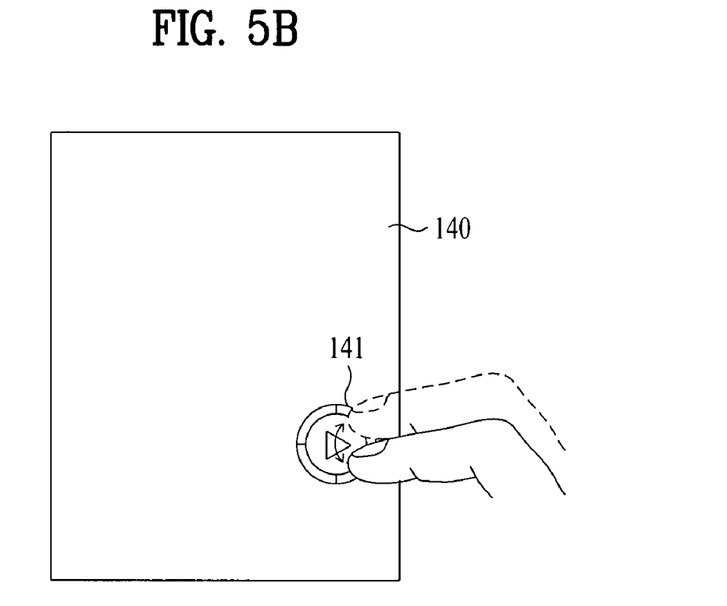

FIG. 5B shows that the object can be fixed to the specified position if the terminal user rubs the object at least prescribed number of times.

Figure 5C:
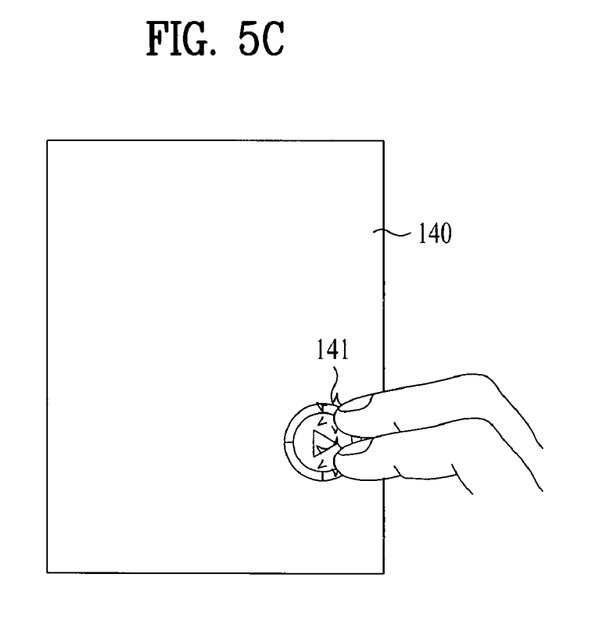

FIG. 5C shows that the object can be fixed to the specified position if the terminal user simultaneously touches a plurality of points on the object.

Figure 5D:
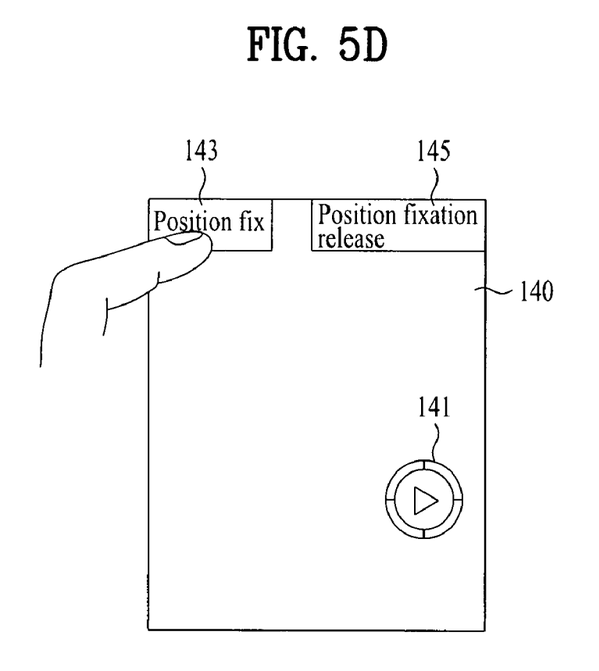

And, FIG. 5D shows that the object can be fixed to the specified position if the terminal user touches a 'position fixing' icon 143 separately provided to the touchscreen while the object is selected.

Figure 6:
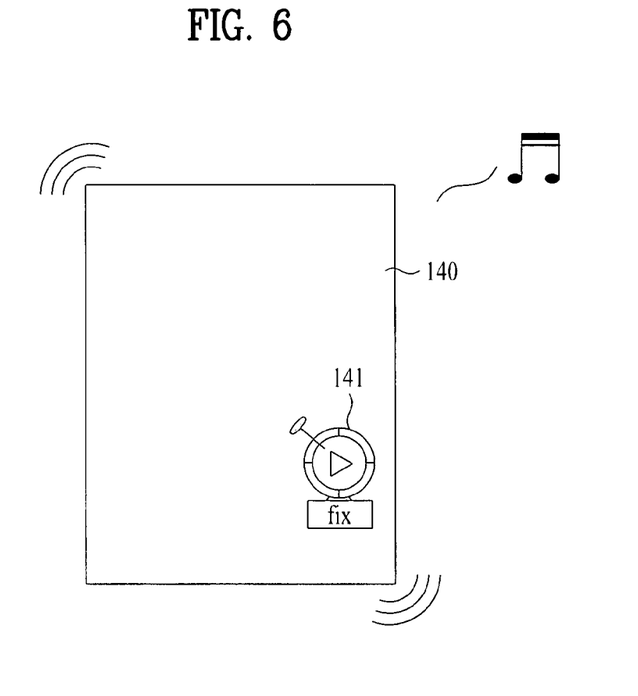

Once the object is fixed to the specific position, at least one of a shape or color of the object, as shown in FIG. 6, is changed to visually inform the terminal user that the object is fixed to the position. In the present embodiment of the present invention, the shape can include a text. Preferably, the alarm outputting unit 160 outputs at least one of an alarm sound or vibration to aurally and tactually inform the terminal user that the object is fixed to the position.

Figure 7:
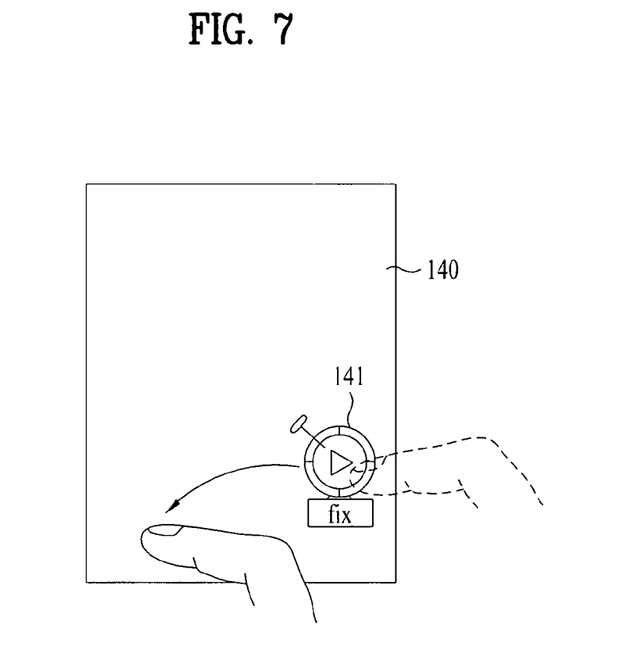

The fixed object 141, as shown in FIG. 7, is not moved even if the terminal user touches and drags & drops the object. If the terminal user unintentionally tries to move the object on the touchscreen, the object 141 is not moved. So, the terminal user is able to easily find the object 141 at a prescribed position (i.e., the specified position-A).

Meanwhile, a touch action for releasing the position fixation can be conducted on the position-fixed object 141 by the terminal user (S27).

The touch action for releasing the position fixation is identical or similar to the aforesaid touch action shown in FIGS. 5A to 5D. In particular, the touch action for releasing the position fixation can be summarized into an action of keep touching the fixed object during a prescribed time at least, an action of rubbing the fixed object, an action of touching a plurality of points on the fixed object simultaneously, and an action of touching the 'position fixation releasing' icon 145 while the fixed object is selected, and the like. It is a matter of course that the touch time, rubbing count, number of the simultaneously touched points of the touch actions can be adjusted in a different manner of the aforesaid touch actions for the position fixation. These touch actions are apparent to those skilled in the art from FIGS. 5A to 5D, of which details are omitted.

Figure 8:
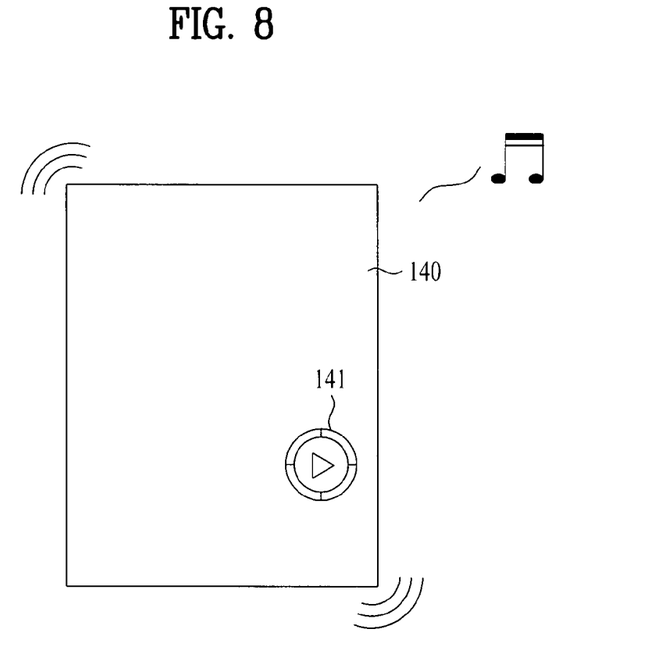

Once the position fixation of the object 141 is released, at least one of a shape or color of the object, as shown in FIG. 8, is recovered to the original one to visually inform the terminal user that the position fixation of the object is released. Preferably, the alarm outputting unit 160 outputs at least one of alarm sound or vibration to aurally and tactually inform the terminal user that the position fixation of the object is released.

Figure 9:
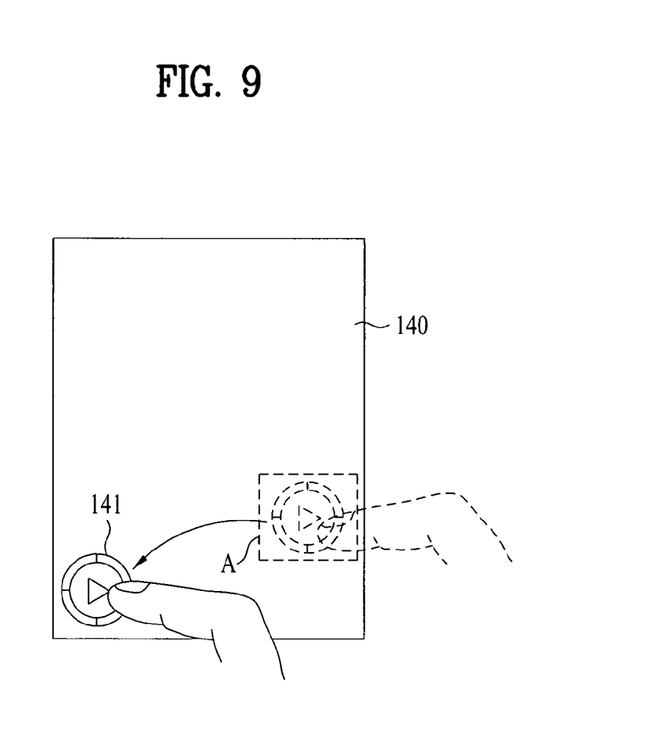

Once the position fixation of the object 141 is released, the object, as shown in FIG. 9, can be moved to another position from the specified position-A (S29).

Accordingly, the present invention provides the following effects or advantages.

First of all, a position of an object displayed on a touchscreen can be fixed according to a necessity of a terminal user. Once the position of the object is fixed, even if the terminal user unintentionally tries to drag and drop the object, the object is not moved. Hence, the terminal user makes a specified object fixed to a specific position, thereby finding the specified object on the touchscreen easily.

It will be apparent to those skilled in the art that various modifications and variations can be made in the present invention without departing from the spirit or scope of the inventions. For instance, a light emitting device (LED) is provided to a mobile terminal to emit light if a position of an object is fixed. So, a terminal can be configured to inform a terminal user of the position fixation of the object.

Thus, it is intended that the present invention covers the modifications and variations of this invention provided they come within the scope of the appended claims and their equivalents.

What is claimed is:

1. A mobile terminal comprising:
   a touch screen configured to display at least one object and to sense first and second touching actions on the at least one object; and
   a control unit configured to display the at least one object as being fixed and not moveable, to release the at least one object according to the second touching action such that the at least one object can be moved, to move the at least one object from a first position to a second position on the touch screen corresponding to the first touching action on the at least one object, and to fix the moved object to the second position on the touch screen based on a manipulation of a position fixing button that is separate from the first and second touching actions,
   wherein the first touching action is a dragging and dropping touching action on the touch screen,
   wherein the second touching action includes touching the at least one object for a predetermined time period, and
   wherein the control unit is further configured to indicate whether or not the moved object is fixed to the second position by displaying an additional icon or graphical indication on the at least one object.

2. The mobile terminal of claim 1, further comprising:
   an output unit configured to output at least one of a sound and a vibration to indicate that the moved object is fixed to the second position according to a control of the control unit.

3. The mobile terminal of claim 1, wherein the control unit is further configured to display the additional icon or graphical indication on the moved object such that an outline shape of the moved object is altered.

4. The mobile terminal of claim 3, wherein the control unit is further configured to display the additional icon or graphical indication on an upper left portion of the moved object when viewing the object such that an outline shape of the upper left portion of the moved object is altered.

5. A method of displaying an object in a mobile terminal, the method comprising:
   displaying at least one object as being fixed and not moveable on a touch screen of the mobile terminal;
   releasing the fixed object according to a second touching action such that the at least one object can be moved;
   moving the at least one object from a first position to a second position on the touch screen corresponding to a first touching action on the at least one object; and
   fixing the moved object to the second position on the touch screen based on a manipulation of a position fixing button that is separate from the first and second touching actions,
   wherein the first touching action is a dragging and dropping touching action on the touch screen,
   wherein the second touching action includes touching the at least one object for a predetermined time period, and
   wherein the method further comprises indicating whether or not the moved object is fixed by displaying an additional icon or graphical indication on the at least one object.

6. The method of claim 5, further comprising:
   outputting at least one of a sound and a vibration to indicate that the moved object is fixed to the second position.

7. The method of claim 5, wherein the indicating step displays the additional icon or graphical indication on the moved object such that an outline shape of the moved object is altered.

8. The method of claim 7, wherein the indicating step displays the additional icon or graphical indication on an upper left portion of the moved object when viewing the object such that an outline shape of the upper left portion of the moved object is altered.

* * * * *